United States Patent
Otsuki et al.

(10) Patent No.: US 11,064,115 B2
(45) Date of Patent: *Jul. 13, 2021

(54) IMAGE SENSOR, IMAGE PICKUP APPARATUS, IMAGE SENSOR-IDENTIFYING METHOD, IMAGE FORGERY-PREVENTING METHOD, AND IMAGE ALTERNATION-LIMITING METHOD

(71) Applicant: SONY CORPORATION, Tokyo (JP)

(72) Inventors: Seichi Otsuki, Kanagawa (JP); Shigeyuki Baba, Tokyo (JP); Shigeki Nakamura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,473

(22) Filed: Apr. 27, 2020

(65) Prior Publication Data

US 2020/0260002 A1      Aug. 13, 2020

Related U.S. Application Data

(63) Continuation of application No. 16/086,524, filed as application No. PCT/JP2016/088895 on Dec. 27, 2016, now Pat. No. 10,764,492.

(30) Foreign Application Priority Data

Mar. 31, 2016  (JP) ................. 2016-073266

(51) Int. Cl.
*H04N 5/232*    (2006.01)
*H04N 5/225*    (2006.01)
(Continued)

(52) U.S. Cl.
CPC ......... *H04N 5/23229* (2013.01); *G06F 21/44* (2013.01); *G06F 21/64* (2013.01);
(Continued)

(58) Field of Classification Search
CPC .. H04N 5/23229; H04N 5/3745; H04N 5/772; H04N 5/2253; H04N 5/369;
(Continued)

(56) References Cited

U.S. PATENT DOCUMENTS 7,663,670 B1 *  2/2010  Orboubadian ........... H04N 5/76
                                                        348/231.2
7,822,225 B2   10/2010  Alattar
(Continued)

FOREIGN PATENT DOCUMENTS

CN        106233465 A       12/2016
EP          1751690 A2       2/2007
(Continued)

OTHER PUBLICATIONS

Non-Final Office Action for U.S. Appl. No. 16/086,524, dated Nov. 15, 2019, 15 pages.
(Continued)

*Primary Examiner* — Marly S Camargo
(74) *Attorney, Agent, or Firm* — Chip Law Group

(57) ABSTRACT

An image sensor includes an image information processing unit that forms integrated information in which image sensor identification information capable of identifying the image sensor and image information obtained by an analog/digital conversion unit are associated with each other, and an image information output unit that outputs the integrated information to an external unit.

15 Claims, 9 Drawing Sheets

(51) Int. Cl.

| | | |
|---|---|---|
| *H04N 5/77* | (2006.01) | |
| *H04N 5/369* | (2011.01) | |
| *G06F 21/44* | (2013.01) | |
| *G06F 21/64* | (2013.01) | |
| *G11B 20/00* | (2006.01) | |
| *H04L 9/08* | (2006.01) | |
| *H04N 5/3745* | (2011.01) | |

(52) U.S. Cl.
CPC ...... *G11B 20/00086* (2013.01); *H04L 9/0822* (2013.01); *H04N 5/2253* (2013.01); *H04N 5/369* (2013.01); *H04N 5/3745* (2013.01); *H04N 5/772* (2013.01)

(58) Field of Classification Search
CPC ....... G06F 21/64; G06F 21/44; H04L 9/0822; H04L 9/3263; H04L 9/3247; H04L 9/3236; G11B 20/00086
USPC ........... 348/222.1, 211.5, 460, 608; 382/100; 725/31, 20; 704/500, 501, 502, 504, 704/E21.015; 705/71, 64; 713/168, 190, 713/191; 375/240.28
See application file for complete search history.

(56) References Cited

U.S. PATENT DOCUMENTS

| | | |
|---|---|---|
| 10,469,486 B2 | 11/2019 | Baras et al. |
| 10,491,402 B2 | 11/2019 | Kaehler |
| 2002/0191810 A1 | 12/2002 | Fudge et al. |
| 2003/0065619 A1* | 4/2003 | Shitano .................. G06F 17/60 705/5 |
| 2005/0169499 A1* | 8/2005 | Rodriguez ............... G06K 9/00 382/100 |
| 2008/0163364 A1* | 7/2008 | Ferlitsch ................. G06F 17/30 715/530 |
| 2010/0008538 A1 | 1/2010 | Rodriguez et al. |
| 2011/0158470 A1 | 6/2011 | Martin et al. |
| 2013/0043632 A1 | 2/2013 | Sorabji et al. |
| 2014/0049653 A1* | 2/2014 | Leonard ................ G06T 1/0042 713/176 |

FOREIGN PATENT DOCUMENTS

| | | |
|---|---|---|
| JP | 2001-203874 A | 7/2001 |
| JP | 2005-045486 A | 2/2005 |
| JP | 2005-176263 A | 6/2005 |
| JP | 2007-528644 A | 10/2007 |
| KR | 10-2016-0144358 A | 12/2016 |
| TW | 201540072 A | 10/2015 |
| WO | 2005/076985 A2 | 8/2005 |
| WO | 2015/159728 A1 | 10/2015 |

OTHER PUBLICATIONS

Notice of Allowance for U.S. Appl. No. 16/086,524, dated Mar. 30, 2020, 15 pages.
International Search Report and Written Opinion of PCT Application No. PCT/JP2016/088895, dated Mar. 7, 2017, 09 pages of English Translation and 08 pages of ISRWO.
International Preliminary Report on Patentability of PCT Application No. PCT/JP2016/088895, dated Oct. 11, 2018, 09 pages of English Translation and 05 pages of IPRP.

* cited by examiner

IMAGE SENSOR, IMAGE PICKUP APPARATUS, IMAGE SENSOR-IDENTIFYING METHOD, IMAGE FORGERY-PREVENTING METHOD, AND IMAGE ALTERNATION-LIMITING METHOD

CROSS REFERENCE TO RELATED APPLICATIONS

The present application is a continuation application of U.S. patent application Ser. No. 16/086,524, filed Sep. 19, 2018, now U.S. Pat. No. 10,764,492, which is a U.S. National Phase of International Patent Application No. PCT/JP2016/088895 filed Dec. 27, 2016, which claims priority benefit of Japanese Patent Application No. JP 2016-073266 filed Mar. 31, 2016 in the Japan Patent Office. Each of the above-referenced applications is hereby incorporated herein by reference in its entirety.

TECHNICAL FIELD

The present technology relates to an image sensor, an image pickup apparatus, an image sensor-identifying method, an image forgery-preventing method, and an image alternation-limiting method. More particularly, the present technology relates to a technology of an image sensor that outputs identification information specific to the image sensor and image information acquired by that image sensor in association with each other.

BACKGROUND ART

In recent years, for example, a complementary metal oxide semiconductor (CMOS) image sensor, a charge coupled device (CCD) image sensor, or the like is used as an image pickup element (image sensor) of a semiconductor that converts light entering from a lens of an industrial apparatus such as a portable terminal and a digital camera into electrical signals. As an image pickup apparatus having a function of generating image information by using such an image sensor, there is known one capable of mounting a plurality of recording media for the purpose of generating backup data, for example.

In order to guarantee consistency of data recorded on the plurality of recording media, Patent Literature 1 has proposed, for example, an image pickup apparatus including a processing means that performs processing on at least one of first data recorded on a first recording medium or second data recorded on a second recording medium and a determination means that determines whether or not the first data has particular relevance to the second data, in which the processing means determines whether or not to allow the processing on the basis of a determination result of the determination means.

CITATION LIST

Patent Literature

Patent Literature 1: Japanese Patent Application Laid-open No. 2005-176263

DISCLOSURE OF INVENTION

Technical Problem

However, Patent Literature 1 has disclosed a technology of guaranteeing consistency between a plurality of pieces of data, but Patent Literature 1 has not disclosed a technology of identifying, on the basis of acquired image information, an image pickup element which has generated that image information.

Therefore, with the technology of Patent Literature 1, it is difficult to identify the image pickup element which has generated the image information. There is a problem that it is impossible to guarantee consistency between acquired image information and picked-up image information.

The present technology has been made in view of the above-mentioned circumstances and it is an object thereof to provide an image sensor capable of guaranteeing consistency between acquired image information and picked-up image information.

Solution to Problem

In order to solve the above-mentioned problem, an image sensor that is an example of the present technology at least includes: an image information processing unit that forms integrated information in which image sensor identification information capable of identifying the image sensor and image information obtained by an analog/digital conversion unit are associated with each other; and an image information output unit that outputs the integrated information to an external unit.

Further, an image pickup apparatus that is an example of the present technology at least includes: an image sensor including an image information processing unit that forms integrated information in which image sensor identification information capable of identifying the image sensor and image information obtained by an analog/digital conversion unit are associated with each other, and an image information output unit that outputs the integrated information to an external unit.

Further, an image sensor-identifying method that is an example of the present technology includes identifying an image sensor by analyzing integrated information in which image sensor identification information capable of identifying the image sensor and image information obtained by an analog/digital conversion unit are associated with each other, the integrated information being output from the image sensor to an external unit.

Further, an image forgery-preventing method that is an example of the present technology includes preventing forgery of image information by using electronic signature information in which image sensor identification information capable of identifying an image sensor and image information obtained by an analog/digital conversion unit are associated with each other and are encrypted, the electronic signature information being output from the image sensor to an external unit.

Further, an image alternation-limiting method that is an example of the present technology includes giving an image alternation privilege only to decrypted image information obtained by performing decryption processing on image information including electronic signature information in which image sensor identification information capable of identifying an image sensor and the image information obtained by an analog/digital conversion unit are associated with each other and are encrypted, the image information being output from the image sensor to an external unit.

Advantageous Effects of Invention

In accordance with the present technology, it becomes possible to provide an image sensor capable of guaranteeing consistency between acquired image information and picked-up image information. It should be noted that effects of the present technology are not necessarily limited to the above-mentioned effects and any effect described in the present disclosure may be provided.

MODE(S) FOR CARRYING OUT THE INVENTION

Figure 1:
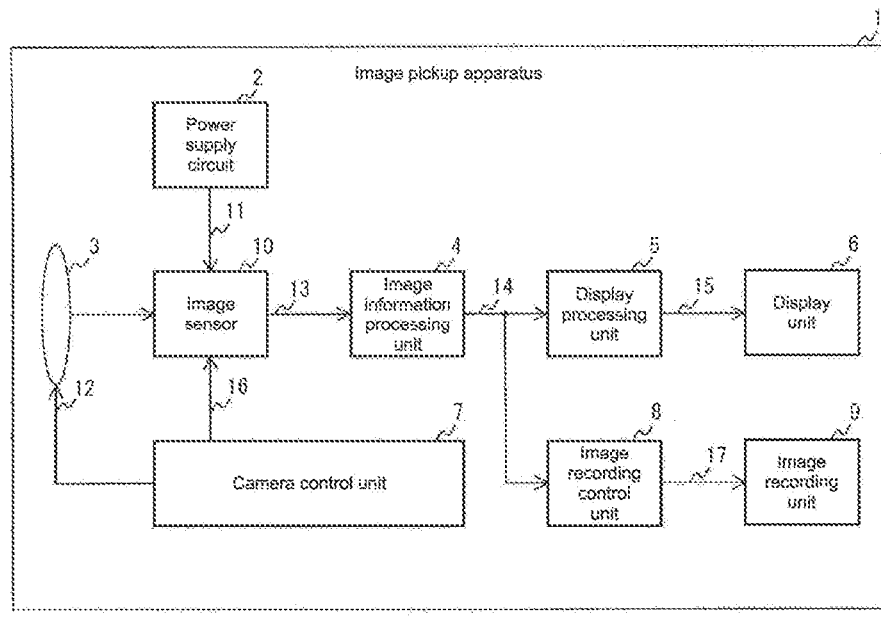
FIG. 1 A block diagram showing a configuration example of an image pickup apparatus according to the present technology.

Hereinafter, favorable modes for carrying out the present technology will be described with reference to the drawings. Note that embodiments to be described below show examples of representative embodiments of the present technology, and the scope of the present technology should not be interpreted narrowly due to those embodiments. Descriptions are given in the following order.
1. Configuration Example of Image Pickup Apparatus
2. First Stacking Example of Image Sensor
3. Second Stacking Example of Image Sensor
4. First Image Information-Outputting Method
5. Second Image Information-Outputting Method
6. Image Sensor-Identifying Method
7. First Image Forgery-Preventing Method
8. Second Image Forgery-Preventing Method
9. Image Alternation-Limiting Method
10. Various Generation Methods for Electronic Signature Information
11. Various Encryption Methods for Electronic Signature Information
12. Various Reissue Methods for Electronic Signature Information after Development
13. Addition Method for Reliability Information
14. Application Service
15. Configuration Example of Personal Computer 1. Configuration Example of Image Pickup Apparatus FIG. 1 is a block diagram showing a configuration example of an image pickup apparatus of an embodiment according to the present technology. An image pickup apparatus 1 is an apparatus that picks up and records an image and the like. The image pickup apparatus 1 includes, as an example, a digital camera, a video camera, and the like. The image pickup apparatus 1 includes a power supply circuit 2, an image pickup lens 3, an image information processing unit 4, a display processing unit 5, a display unit 6, a camera control unit 7, an image recording control unit 8, an image recording unit 9, and an image pickup element (image sensor) 10. As the image sensor, a complementary metal oxide semiconductor (CMOS) image sensor, a charge coupled device (CCD) image sensor, or the like can be used, for example. Note that the image pickup apparatus and the image sensor according to the present technology are not limited to this embodiment.

The power supply circuit 2 supplies power to the image sensor 10 via a power supply line 11. The image pickup lens 3 concentrates object light and guides it to the image sensor 10.

Under the camera control unit 7 via a signal line 12, the image sensor 10 generates image information on the basis of light received through the image pickup lens 3. The image sensor 10 outputs the generated image information to the image information processing unit 4 via the signal line 13.

The image information processing unit 4 executes image processing such as demosaic processing and white balance processing on image information acquired from the image sensor 10. The image information processing unit 4 outputs the processed image information to the display processing unit 5 and the image recording control unit 8 via a signal line 14.

It is assumed that the display processing unit 5 executes display processing such as gamma correction processing, color correction processing, and contrast adjustment processing on the acquired image information in a manner that depends on needs. The display processing unit 5 outputs image information after the display processing to the display unit 6 via a signal line 15. The display unit 6 displays the image information received from the display processing unit 5.

The camera control unit 7 comprehensively controls the image pickup apparatus 1. In accordance with a user's operation, the camera control unit 7 outputs a control signal to the image sensor 10 via a signal line 16 for generating image information.

The image recording control unit 8 causes the image recording unit 9 to record the image information from the image information processing unit 4 via a signal line 17. The image recording unit 9 records the image information.

2. First Stacking Example of Image Sensor

Figure 2:
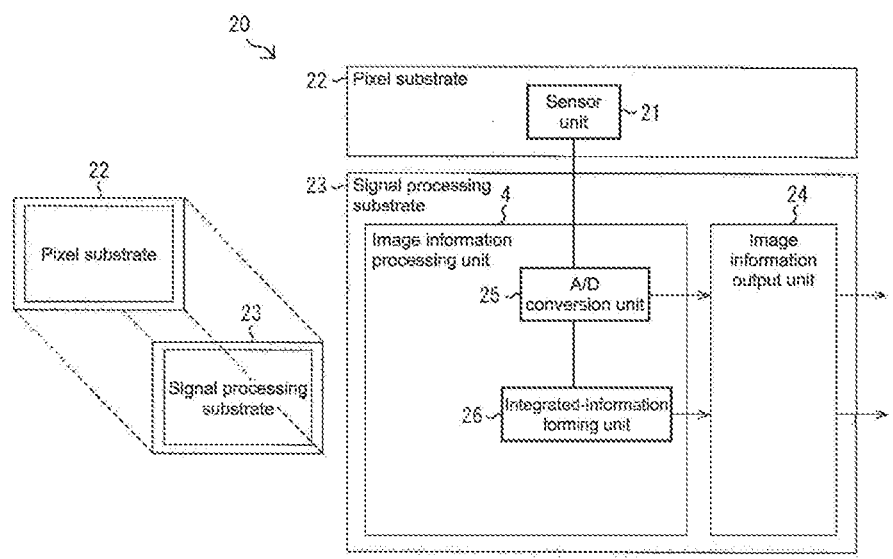
FIG. 2 A block diagram showing a first stacking example of an image sensor according to the present technology.

FIG. 2 is a block diagram showing a stacking example of a first embodiment of a stacked image sensor according to the present technology. For example, a stacked CMOS image sensor can be used as the stacked image sensor, though the present technology is not limited thereto. Further, a backside illumination type CMOS image sensor can be used as the CMOS image sensor. In the backside illumination type CMOS image sensor, pixels, circuits, and the like are formed on a silicon substrate, and the silicon substrate on the back side of the image sensor is thinned to several micrometers to have a structure for taking in light.

As shown in FIG. 2, in a stacked image sensor 20 of this embodiment, a signal processing substrate 23 is arranged on the back side of a pixel substrate 22 including a sensor unit 21 that photoelectrically converts optical signals from an object into electrical signals. In this manner, it is stacked in two layers. The signal processing substrate 23 includes the image information processing unit 4 as shown in FIG. 1 and an image information output unit 24.

The image information processing unit 4 includes at least an analog/digital conversion unit (A/D conversion unit) 25 that converts the electrical signals output from the sensor unit 21, which are analog signals, into digital signals and an integrated-information forming unit 26 that forms integrated information in which image information obtained by the A/D conversion unit 25 and image sensor identification information of the image sensor 20 are associated with each other.

Here, the "image sensor identification information" refers to information capable of identifying the image sensor, such as type information of the image sensor, a manufacture number specific to the image sensor, manufacture date and time information of the image sensor, GPS information, an image pickup condition including an image pickup time, and the like.

The image information output unit 24 outputs image information output from the A/D conversion unit 25 and integrated information output from the integrated-information forming unit 26 to the external unit.

Here, the "external unit" refers to a recording medium that saves image information generated by the image sensor, a network that transmits that image information, an image pickup apparatus main body such as a digital camera that processes that image information, a personal computer (PC), a portable terminal, a game console, a contactless IC card such as FeliCa (registered trademark), a USB memory, and the like.

As in the image sensor 20 of this embodiment, by employing a two-layer stacking structure in which the signal processing substrate 23 is covered with the pixel substrate 22, an arrangement is achieved to prevent the external unit to easily read and analyze the integrated information. Thus, the security for the integrated information can be increased.

3. Second Stacking Example of Image Sensor

Figure 3:
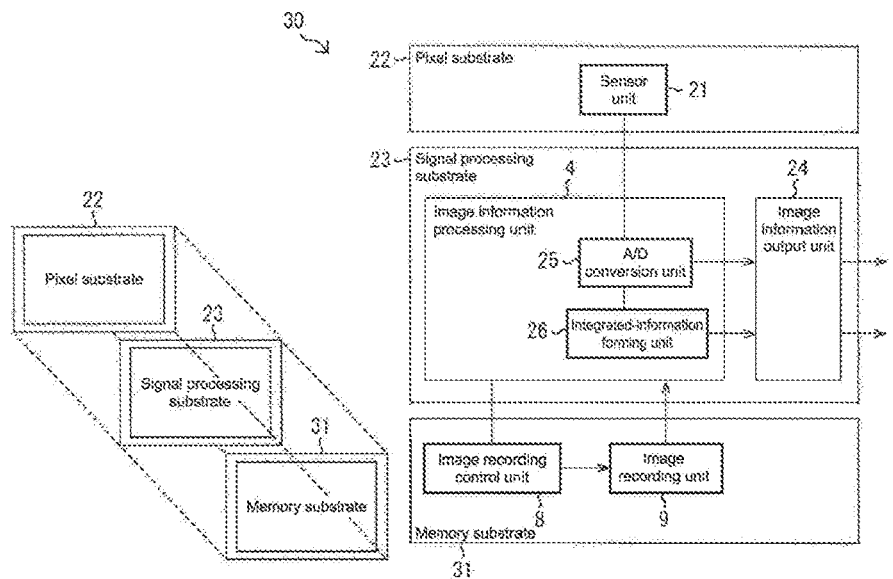
FIG. 3 A block diagram showing a second stacking example of the image sensor according to the present technology.

FIG. 3 is a block diagram showing a stacking example of a second embodiment of the stacked image sensor according to the present technology. As in FIG. 2, for example, the stacked CMOS image sensor can be used as the stacked image sensor, though the present technology is not limited thereto.

As shown in FIG. 3, in a stacked image sensor 30 of this embodiment, the signal processing substrate 23 is arranged between the pixel substrate 22 including the sensor unit 21 and a memory substrate 31. In this manner, it is stacked in three layers. As in FIG. 2, the signal processing substrate 23 includes the image information processing unit 4 and the image information output unit 24.

The memory substrate 31 includes the image recording control unit 8 that controls recording of the image information output from the image information processing unit 4 and the image recording unit 9 that records the image information output from the image recording control unit 8.

In accordance with a command signal from the image information processing unit 4, the image recording unit 9 outputs the recorded image information to the image information processing unit 4.

As in the image sensor 30 of this embodiment, by employing the three-layer stacking structure in which a front surface and a rear surface of the signal processing substrate 23 are covered with the pixel substrate 22 and the memory substrate 31, an arrangement is achieved to further prevent the external unit to easily read and analyze the integrated information in comparison with the two-layer stacking structure as shown in FIG. 2. Thus, the security for the integrated information can be further increased.

4. First Image Information-Outputting Method

Figure 4:
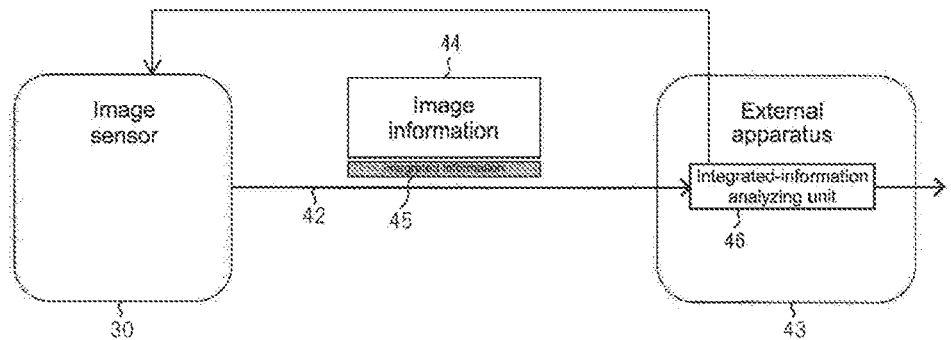
FIG. 4 A schematic view for describing a first image information-outputting method according to the present technology.

FIG. 4 is a schematic view for describing an image information-outputting method of the first embodiment according to the present technology. This embodiment shows a mode to transmit the image information and the integrated information from an image sensor to an external apparatus that is an example of the external unit via one image transmission path.

Image information 44 generated by the image sensor 30 of this embodiment is transmitted to an external apparatus 43 that is an example of the external unit through an image transmission path 42 via an interface unit as well as integrated information 45 in which the image information 44 and the image sensor identification information of the image sensor 30 are associated with each other. The external apparatus 43 includes an integrated-information analyzing unit 46 that identifies the image sensor 30 by analyzing the transmitted integrated information 45. The external apparatus 43 receives the image information 44 and the integrated information 45 in the integrated-information analyzing unit 46, analyzes integrated information 56, and identifies the image sensor 30.

The image sensor 30 is capable of writing the integrated information 45 such as encrypted electronic signature information outside an effective image frame of the image information 44 and outputting the image information 44. With this configuration, it becomes easy to synchronize the output of the image information 44 with the output of the integrated information 45.

Further, the image sensor 30 is also capable of displaying and overwriting the integrated information 45 such as encrypted electronic signature information or overwriting the integrated information 45 such as electronic signature information as an electronic watermark in a part of the effective image frame of the image information 44 or the entire effective image frame of the image information 44 and outputting the image information 44. With this configuration, it becomes possible to receive and send the integrated information 45 without the need for changing the existing interface unit and it becomes easy to synchronize the output of the image information 44 with the output of the integrated information 45.

Further, the image sensor 30 is also capable of displaying partial pixel information as partial pixel information in a part of the effective image frame of the image information 44 or the entire effective image frame of the image information 44, overwriting the integrated information 45 of electronic signature information that can be discriminated and the like, and outputting the image information 44. With this configuration, it is possible to explicitly indicates that the image information 44 is image information with the integrated information 45.

The image sensor 30 of this embodiment can also have a function which enables the external unit to control a generation timing of the integrated information 45 such as encrypted electronic signature information. With this function, it is possible to reduce the generation load of the integrated information 45 and it becomes easy to synchronize the output of the image information 44 with the output of the integrated information 45.

Further, the image sensor 30 can also have a function of controlling the generation timing of the integrated information 45 in accordance with a dedicated control signal. With this function, by generating the integrated information 45 only when a still image is taken, it is possible to reduce the load and power consumption of the image sensor 30.

In addition, the image sensor 30 can also have a function of setting a generation cycle of the integrated information 45. With this function, it is possible to reduce the load and power consumption of the external apparatus 43 that is on a developer side and the image sensor 30 when the integrated information 45 is regularly adding to a header for a moving image.

5. Second Image Information-Outputting Method

Figure 5:
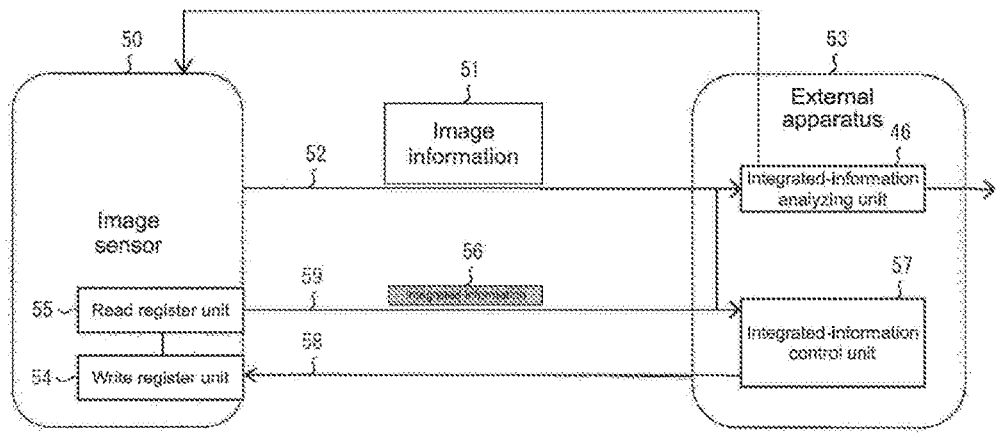
FIG. 5 A schematic view for describing a second image information-outputting method according to the present technology.

FIG. 5 is a schematic view for describing an image information-outputting method of a second embodiment according to the present technology. This embodiment shows a mode to transmit image information and integrated information from an image sensor to an external apparatus that is an example of the external unit via different transmission paths.

Image information 51 generated by an image sensor 50 of this embodiment is transmitted to an external apparatus 53 through an image transmission path 52 via an interface unit. Further, the image sensor 50 includes a write register unit 54 and a read register unit 55. The write register unit 54 receives a command signal of an instruction, control, and the like of a timing and the like for generating the integrated information 56 such as electronic signature information from the external apparatus 53. The instruction includes, for example, an encryption instruction and the like. The read register unit 55 controls output of the integrated information 56 and the like to the external apparatus 53 and the like.

The external apparatus 53 of this embodiment includes the integrated-information analyzing unit 46 and an integrated-information control unit 57. The integrated-information analyzing unit 46 receives and analyzes the image information 51 and the integrated information 56. The integrated-information control unit 57 outputs a command signal of instruction, control, and the like of a timing and the like for generating the integrated information 56 to the image sensor 50.

The image sensor 50 forms the integrated information 56 in accordance with the command signal sent from the integrated-information control unit 57 of the external apparatus 53 to the write register unit 54 via a transmission path 58. The image sensor 50 transmits the formed integrated information 56 from the read register unit 55 to the integrated-information analyzing unit 46 of the external apparatus 53 via a transmission path 59. The external apparatus 53 which has received the image information 51 and the integrated information 56 analyzes the integrated information 56 at the integrated-information analyzing unit 46 and identifies the image sensor 50.

The image sensor 50 of this embodiment is capable of outputting the integrated information 56 such as encrypted electronic signature information via the read register unit 55 of the image sensor 50. With this configuration, it becomes possible to receive and send the integrated information 56 without changing an image input/output interface unit.

Further, the image sensor 50 can also have a function of outputting the integrated information 56 associated with a frame ID of the image information 51. With this function, it becomes easy to synchronize the output of the image information 51 of the image sensor 50 with the output of the integrated information 56.

6. Image Sensor-Identifying Method

Figure 6:
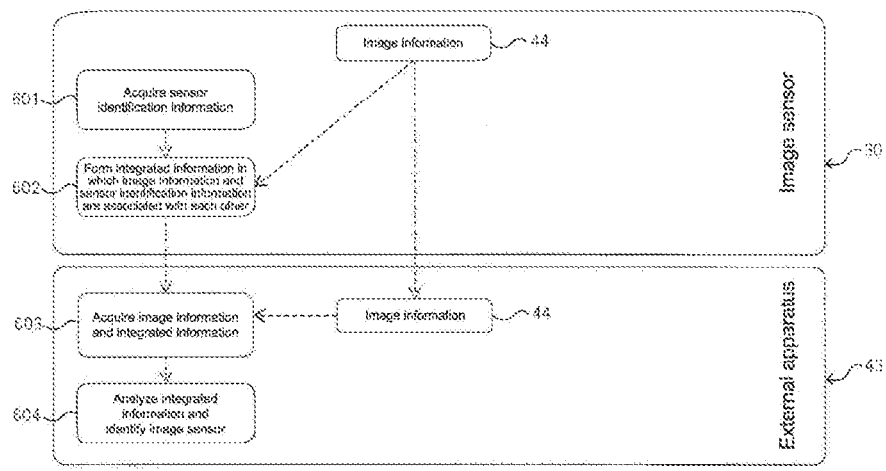
FIG. 6 A conceptual diagram for describing an image sensor-identifying method according to the present technology.

FIG. 6 is a conceptual diagram for describing an image sensor-identifying method of the embodiment according to the present technology. FIG. 6 shows a flow of information to output the image information 44 and the integrated information 45, for example, from the image sensor 30 of FIG. 4 to the external apparatus 43 by using the image sensor-identifying method of this embodiment.

Specifically, in Processing 601, the image sensor 30 acquires the image sensor identification information of the image sensor 30. In Processing 602, the image sensor 30 forms integrated information 45 in which the image information 44 and the image sensor identification information are associated with each other. Then, the image sensor 30 outputs the image information 44 and the integrated information 45 to the external apparatus 43.

In Processing 603, the external apparatus 43 acquires the image information 44 and the integrated information 45 from the image sensor 30. Then, in Processing 604, the external apparatus 43 analyzes the integrated information 45 and identifies the image sensor 30 which has generated the image information 44.

Here, the following three methods, for example, are conceivable as a method of associating the image information with the image sensor identification information. A first method includes direct association. Specifically, for example, information specific to the image sensor is combined with information extracted from the image information in accordance with a predetermined rule, and bit rows are simply connected or rearrangement is performed in accordance with a certain rule. In this method, the image information is easily forged. However, the information specific to the image sensor is also included in the integrated information in which the image information and the image sensor identification information are associated with each other, and thus a large amount of information can be included in the integrated information.

A second method includes indirect association. Specifically, information extracted from the image information is encrypted by using an encryption key specific to the image sensor. In this case, the information specific to each image sensor is only information corresponding to each encryption key. In this method, it is difficult to forge the image information. However, the information specific to sensor is not included in the integrated information.

A third method includes a combination of the first and second methods. In this method, the forgery is difficult and a large amount of information can be included in the integrated information.

In this embodiment, the external apparatus 43 is capable of analyzing the image sensor identification information in the integrated information 45 acquired from the image sensor 30 and identifying the image sensor 30 which has generated the image information 44. With this configuration, the image sensor 30 of this embodiment is capable of processing the image information 44 by using the image sensor identification information.

Figure 7:
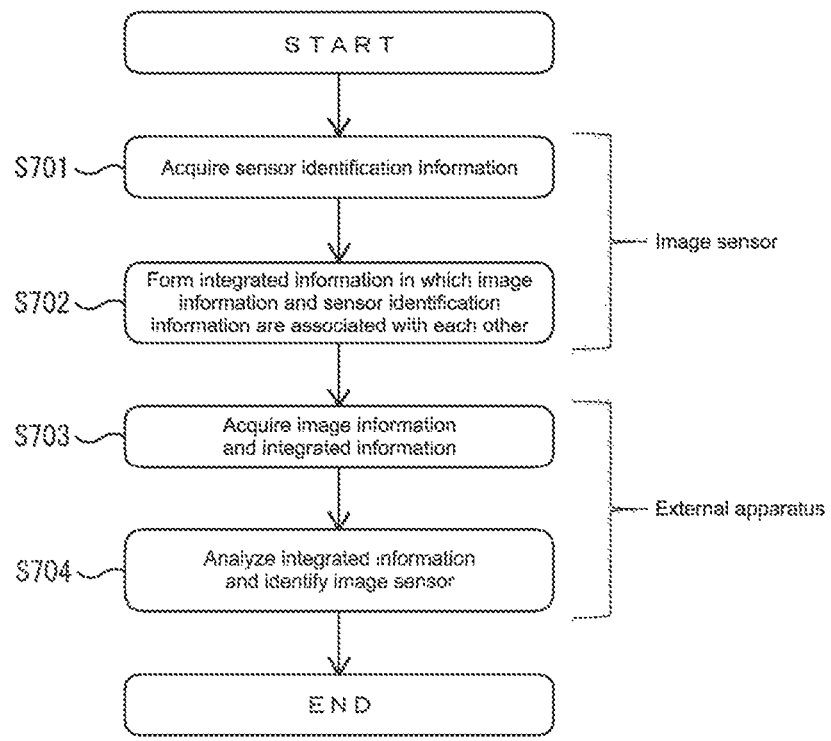
FIG. 7 A flowchart for describing the image sensor-identifying method according to the present technology.

FIG. 7 is a flowchart for describing an image sensor-identifying method of the embodiment according to the present technology. Respective processes of the image sensor-identifying method of this embodiment will be described with reference to FIG. 7.

In this embodiment, for example, a series of processing is started in such a manner that the image information 44 obtained by the A/D conversion unit 25 of the image information processing unit 4 provided in the signal processing substrate 23 of the image sensor 30 in FIG. 3 is output to the integrated-information forming unit 26 of the image information processing unit 4.

First of all, in Step S701, the integrated-information forming unit 26 acquires the image sensor identification information of the image sensor 30, which is generated by an identification information generating unit in the image information processing unit 4. Further, the image information processing unit 4 can include an identification information storage unit that stores the image sensor identification information. In this case, during the manufacture of the image sensor 30, the image sensor identification information can be stored in the identification information storage unit. After the integrated-information forming unit 26 acquires the image sensor identification information from the identification information generating unit or the identification information storage unit, the processing proceeds to Step S702.

In Step S702, the integrated-information forming unit 26 forms integrated information 45 in which the acquired image sensor identification information and the image information 44 obtained by the A/D conversion unit 25 are associated with each other. After the image information 44 and the integrated information 45 are output from the image information output unit 24 to the external apparatus 43 that is an example of the external unit, the processing proceeds to Step S703.

Next, in Step S703, the integrated-information analyzing unit 46 of the external apparatus 43 acquires from the image information output unit 24 to the image information 44 and the integrated information 45. After the image information 44 and the integrated information 45 are acquired by the integrated-information analyzing unit 46, the processing proceeds to Step S704.

In Step S704, the integrated-information analyzing unit 46 identifies the image sensor 30 which has generated the image information 44 on the basis of the image sensor identification information in the integrated information 45, and then terminates the image sensor identification processing.

In accordance with the above-mentioned image sensor-identifying method, in this embodiment, the acquired image information 44 and the image sensor identification information of the image sensor 30 which has generated the image information 44 are output to the external apparatus 43 to be used by a user or the like in association with each other. Thus, it is possible to identify the image sensor 30 which has generated the image information 44.

Further, connected-apparatus information of the external apparatus 43 that is a connection apparatus connected to the image sensor 30 can also be included in the integrated information 45 of this embodiment. With this configuration, it becomes possible to identify not only the image sensor 30 but also the external apparatus 43 on which the image sensor 30 is mounted. Thus, it becomes also possible to find an external apparatus that should not use the image sensor 30. In addition, since the external apparatus 43 also includes apparatuses which affect the image pickup condition such as a lens and an illumination apparatus, it is also possible to select processing suitable for these apparatuses and improve the processing performance thereafter.

7. First Image Forgery-Preventing Method

Figure 8:
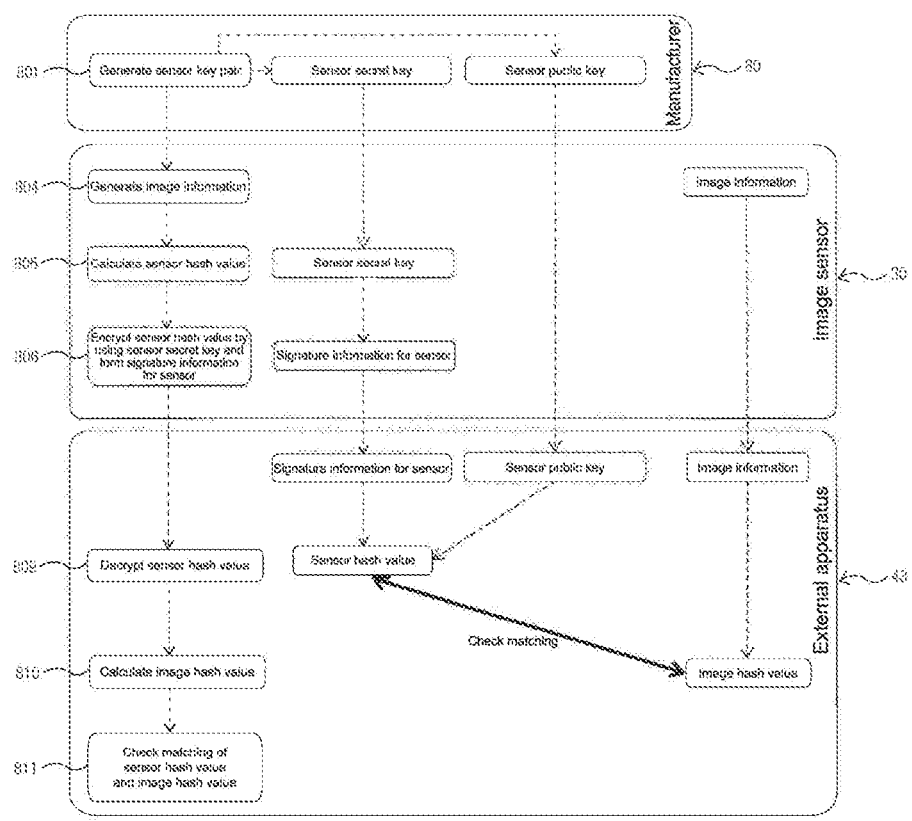
FIG. 8 A conceptual diagram for describing a first image forgery-preventing method according to the present technology.

FIG. 8 is a conceptual diagram for describing an image forgery-preventing method of the first embodiment according to the present technology. FIG. 8 shows a flow of information to output the integrated information in which the image information and the image sensor identification information are encrypted and associated with each other in accordance with the above-mentioned third method to the external apparatus and the like.

The image sensor according to the present technology is an image sensor that performs encryption inside the image sensor by using a public-key method that is a well-known technique as an example of the encryption technique and outputs the encrypted electronic signature information to the external unit. It should be noted that the encryption according to the present technology is not limited to the public-key method.

Here, the "public-key method" refers to cryptography in which information is encrypted and decrypted by using two keys that are paired (public key and secret key). Note that a public key that can be used by an unspecified user and a secret key kept secret can be both used for encryption and decryption.

Specifically, in Processing 801, a manufacturer 80 for the image sensor 30 of FIG. 4 generates a sensor key pair of a sensor public key and a sensor secret key for performing encryption at the image sensor 30. After the sensor key pair is generated, the manufacturer 80 makes the sensor public key available publicly and writes the sensor secret key in the image sensor 30.

In Processing 804, the image sensor 30 generates image information 44. In Processing 805, the image sensor 30 calculates a sensor hash value SH by using a hash function on the basis of the generated image information 44. In Processing 806, the image sensor 30 encrypts the sensor hash value SH and the image sensor identification information of the image sensor 30 by using the sensor secret key, to thereby form signature information for the sensor that is an example of the integrated information 45.

Then, the image sensor 30 outputs the image information 44 and the signature information for the sensor to the external apparatus 43 to be used by a user or the like at the same time.

Here, the "hash function" refers to a function for obtaining a numerical value that represents certain information. Further, the numerical value obtained on the basis of the hash function refers to a hash value. In a case where the same hash function is used, the same hash value is obtained if base information is the same. On the other hand, in a case where the information is different, a different hash value is obtained. Note that the base information cannot be restored on the basis of the hash value. If the image information is encrypted as it is, the computation cost increases and the amount of electronic signature information itself becomes huge. However, in a case where the hash value is used, compression to fixed bits is performed while the alternation-detecting accuracy does not substantially change. Thus, it can contribute to a reduction in computation cost and a reduction in amount of electronic signature information.

The external apparatus 43 that is on the image developer side acquires the output image information 44 with the signature information for the sensor and the sensor public key made available publicly. In Processing 809, the external apparatus 43 decrypts the sensor hash value SH encrypted in the acquired signature information for the sensor by using the acquired sensor public key. Then, in Processing 810, the external apparatus 43 calculates a hash function by using an image hash value RH on the basis of the acquired image information 44.

In Processing 811, the external apparatus 43 determines whether or not the sensor hash value SH and the image hash value RH match each other. If the sensor hash value SH and the image hash value RH match each other, the external apparatus 43 outputs an image, which is not forged, by using the acquired image information 44. If the sensor hash value SH and the image hash value RH do not match each other, the external apparatus 43 does not output the image.

The image sensor 30 of this embodiment outputs the signature information for the sensor in which the generated image information 44 and the image sensor identification information of the image sensor 30 which has generated the image information 44 are associated with each other and are encrypted to the external apparatus 43. Thus, it is possible to identify the image sensor 30 which has generated the image information 44 and it is possible to prevent forgery and alternation of the image information 44.

Note that as the method of making the key available publicly according to the present technology, there is also a method in which the information of the sensor public key is written in the read register unit 55 of the image sensor 50 of FIG. 5, for example. With this method, even if the sensor public key is a sensor public key specific to all image sensors, it becomes possible to easily make it available publicly. Further, as the method of making the key available publicly according to the present technology, there is also a method in which the image sensor 50 makes the information of the sensor public key available publicly on a public document or on the web. With this method, a third party can easily check the integrated information 56 such as encrypted electronic signature information.

Figure 9:
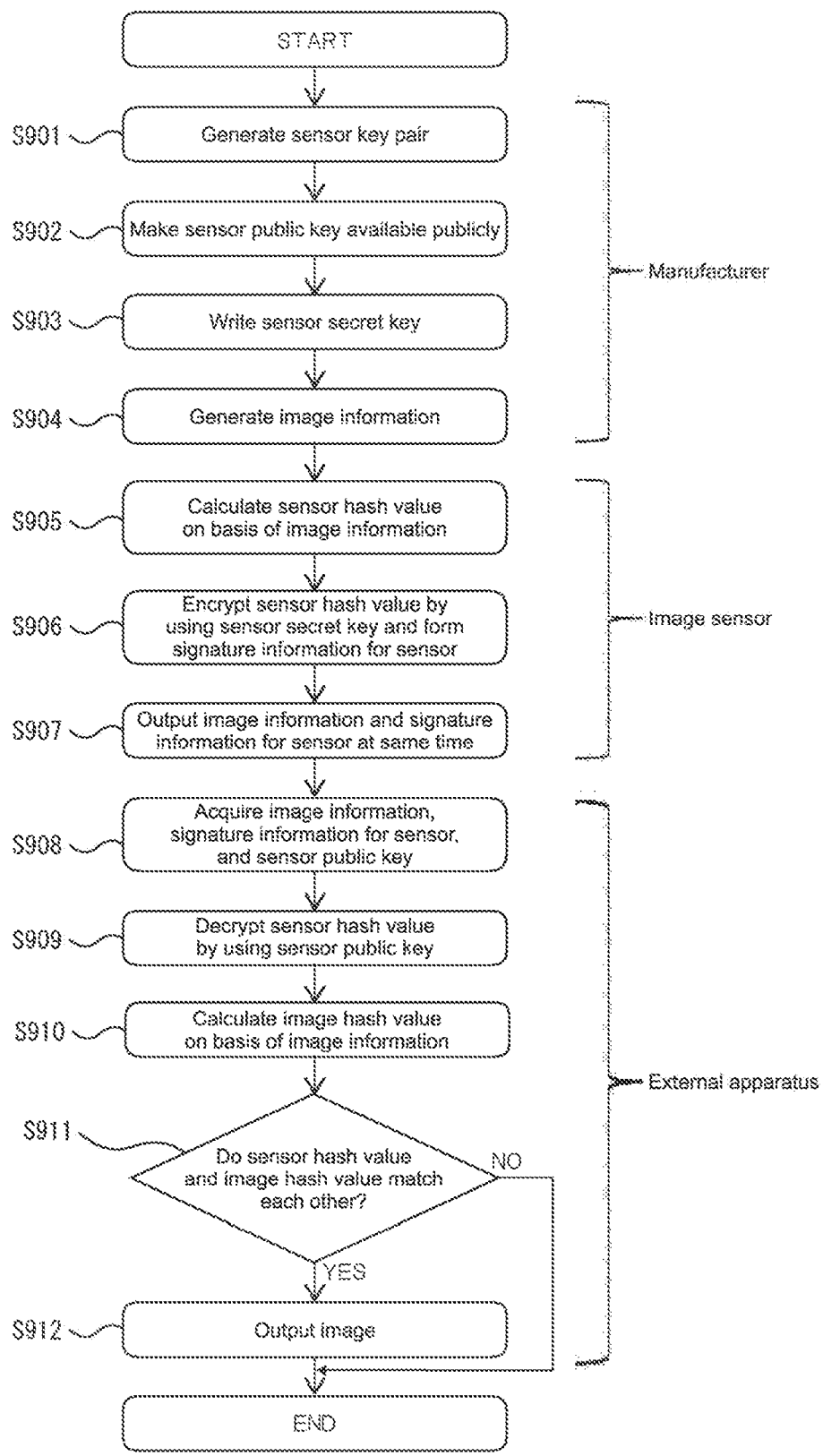
FIG. 9 A flowchart for describing the first image forgery-preventing method according to the present technology.

FIG. 9 is a flowchart for describing an image forgery-preventing method of the first embodiment according to the present technology. Respective processes of the image forgery-preventing method of this embodiment will be described with reference to FIG. 9.

First of all, in Step S901, the manufacturer 80 for the image sensor 30 generates a sensor key pair of a sensor public key and a sensor secret key for performing encryption at the image sensor 30. After the sensor key pair is generated, the processing proceeds to Step S902.

In Step S902, the manufacturer 80 makes the sensor public key available publicly. After the sensor public key is made available publicly, the processing proceeds to Step S903.

In Step S903, the manufacturer 80 writes the sensor secret key in the image sensor 30. After the sensor secret key is written in the image sensor 30, the processing proceeds to Step S904.

Next, in Step S904, the A/D conversion unit 25 of the image sensor 30 receives electrical signals from the sensor unit 21 and generates image information 44. After the image information 44 is generated by the A/D conversion unit 25, the processing proceeds to Step S905.

In Step S905, the integrated-information forming unit 26 of the image sensor 30 calculates a sensor hash value SH by using the hash function on the basis of the generated image information 44. After the sensor hash value SH is calculated by the integrated-information forming unit 26, the processing proceeds to Step S906.

In Step S906, the integrated-information forming unit 26 encrypts the sensor hash value SH and the image sensor identification information of the image sensor 30 by using the sensor secret key, to thereby form signature information for the sensor that is an example of the integrated information 45. After the signature information for the sensor is formed by the integrated-information forming unit 26, the processing proceeds to Step S907.

In Step S907, the image information output unit 24 of the image sensor 30 outputs the generated image information 44 and the signature information for the sensor to the external apparatus 43 to be used by a user or the like at the same time. After the image information 44 with the signature information for the sensor is output to the external apparatus 43, the processing proceeds to Step S908.

Next, in Step S908, the integrated-information analyzing unit 46 of the external apparatus 43 acquires the image information 44 with the signature information for the sensor, which has been output by the image information output unit 24, and the sensor public key made available publicly by the manufacturer 80. After the image information 44 with the signature information for the sensor and the sensor public key are acquired by the integrated-information analyzing unit 46, the processing proceeds to Step S909.

In Step S909, the integrated-information analyzing unit 46 decrypts the sensor hash value SH encrypted in the acquired signature information for the sensor by using the acquired sensor public key. After the sensor hash value SH is decrypted by the integrated-information analyzing unit 46, the processing proceeds to Step S910.

In Step S910, as in the integrated-information forming unit 26, the integrated-information analyzing unit 46 calculates an image hash value RH by using the hash function on the basis of the acquired image information 44. After the image hash value RH is calculated by the integrated-information analyzing unit 46, the processing proceeds to Step S911.

In Step S911, the integrated-information analyzing unit 46 determines whether or not the sensor hash value SH and the image hash value RH match each other.

In Step S911, if YES, i.e., the sensor hash value SH and the image hash value RH match each other, the processing proceeds to Step S912, and the external apparatus 43 outputs an image, which is not forged, by using the acquired image information 44, and then terminates the image forgery-preventing processing. In Step S911, if NO, i.e., if the sensor hash value SH and the image hash value RH do not match each other and the acquired image information 44 is forged or altered, and thus the external apparatus 43 terminates the image forgery-preventing processing without outputting the image.

In the above-mentioned image forgery-preventing method, the image sensor 30 of this embodiment outputs the signature information for the sensor in which the generated image information 44 and the image sensor identification information of the image sensor 30 which has generated the image information 44 are associated with each other and are encrypted to the external apparatus 43. Thus, it is possible to identify the image sensor 30 which has generated the image information 44 and it is possible to prevent forgery and alternation of the image information 44.

In this embodiment, the sensor hash value SH and the image sensor identification information are encrypted and the signature information for the sensor is formed by using the secret key. With this configuration, anyone of a third party can authenticate the image information 44 utilizing this signature information for the sensor.

Further, the image sensor 30 of this embodiment includes a mechanism that outputs the signature information for the sensor and the image information 44 at the same time. With this configuration, it becomes possible to form, immediately after the conversion by the A/D conversion unit 25, the signature information for the sensor under a highest-reliability condition, that is, before the output by the external apparatus 43 which is an external unit with respect to the image sensor 30

Further, as shown in FIG. 3, in such a manner that the signal processing substrate 23 is covered with the three-layer stacked image sensor 30, the image sensor 30 of this embodiment includes a mechanism that conceals the information of the sensor secret key and prevents it from being read from the external unit. With this configuration, the secret key written in the image sensor 30 can be protected from a malicious third party. In addition, by preventing the external unit from easily analyzing the information of the sensor secret key, it is also possible to prevent reading.

In accordance with the image forgery-preventing method of this embodiment, it becomes possible for a user to identify the type of the image sensor by checking matching of the hash values, and the image information can be prevented from being forged. Thus, it is possible to perform development processing specialized for the image sensor. Further, it is also possible to selectively implement high-image quality development processing optimal to image pickup characteristics of the image sensor. Further, it is also possible to feed back optimal settings when image pickup is performed to the image sensor. With these configurations, it becomes possible to freely provide signal processing software for the purpose of promoting sales of image sensors.

In addition, in accordance with the image forgery-preventing method of this embodiment, the image information can be prevented from being copied and altered due to individual discrimination of the image sensor and an image sensor which has picked up an image can be identified. Thus, it is possible to protect the copyright of a digital image taken by a user who uses the image sensor. Further, it is possible to guarantee that the image information is not altered in the highest-reliability phase, that is, after A/D conversion. Thus, a high capability for a crime evidence can be provided.

8. Second Image Forgery-Preventing Method

Figure 10:
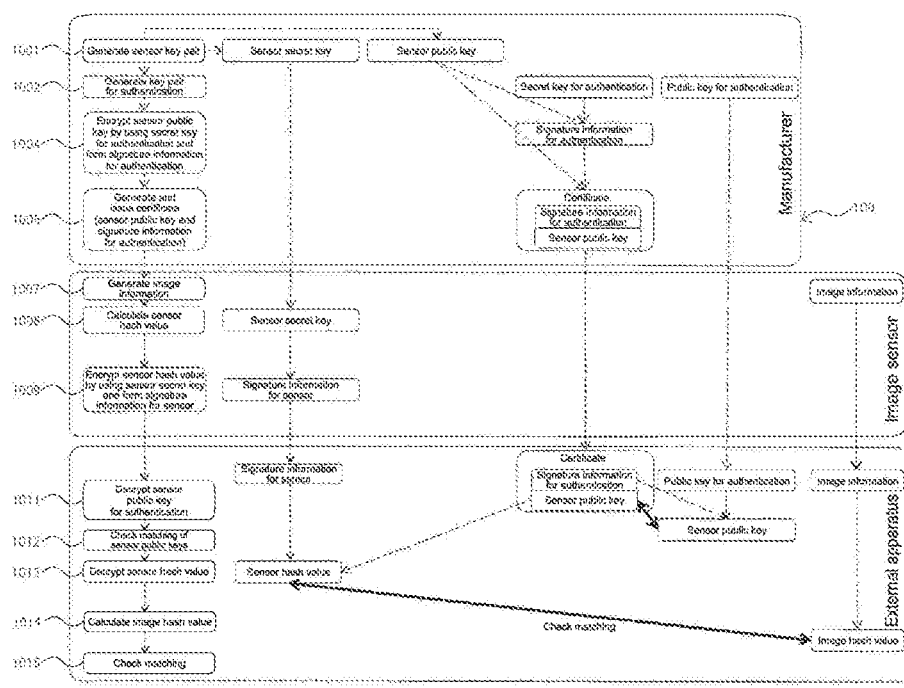
FIG. 10 A conceptual diagram for describing a second image forgery-preventing method according to the present technology.

FIG. 10 is a conceptual diagram for describing an image forgery-preventing method of the second embodiment according to the present technology.

As shown in FIG. 10, in this embodiment, a flow of information to output the integrated information in which the image information and the image sensor identification information are encrypted and associated with each other in accordance with the above-mentioned third method to the external apparatus and the like and to issue a certificate for authentication is shown.

Here, the "certificate" refers to electromagnetic information to be used for checking that a user has made an electronic signature. Further, the "electronic signature" refers to a signature to be made on an electronic document, which is for checking consistency between electronic documents and also checking an author thereof. Note that the certificate can be issued by a manufacturer for the image sensor or a certificate authority (CA) that is a third-party organization that guarantees the validity of the electronic signature.

Specifically, in Processing 1001, a manufacturer 100 for the image sensor 30 of FIG. 4 generates a sensor key pair of a sensor public key SK and a sensor secret key for performing encryption at the image sensor 30. After the sensor key pair is generated, the manufacturer 100 writes the sensor secret key in the image sensor 30.

Further, in Processing 1002, the manufacturer 100 generates a key pair for authentication of a public key for authentication and a secret key for authentication for certificate generation. After the key pair for authentication is generated, the manufacturer 100 makes the public key for authentication available publicly. In Processing 1004, the manufacturer 100 encrypts the sensor public key SK and its owner information by using the secret key for authentication, to thereby form signature information for authentication. In Processing 1005, the manufacturer 100 generates a certificate in which the sensor public key SK and the signature information for authentication are written and issues it to the external apparatus 43 via the image sensor 30.

In Processing 1007, the image sensor 30 generates image information 44. In Processing 1008, the image sensor 30 calculates a sensor hash value SH by using the hash function on the basis of the generated image information 44. In Processing 1009, the image sensor 30 encrypts the sensor hash value SH and the image sensor identification information of the image sensor 30 by using the sensor secret key, to thereby form signature information for the sensor that is an example of the integrated information 45. Then, the image sensor 30 outputs the image information 44 and the signature information for the sensor to the external apparatus 43 to be used by a user or the like at the same time.

The external apparatus 43 that is on the image developer side acquires the output image information 44 with the signature information for the sensor, the certificate issued by the manufacturer 100, and the public key for authentication made available publicly by the manufacturer 100. In Processing 1012, the external apparatus 43 decrypts the encrypted sensor public key CK in the signature information for authentication of the acquired certificate by using the acquired public key for authentication. In Processing 1013, the external apparatus 43 determines whether or not the decrypted sensor public key CK and the sensor public key SK in the certificate match each other.

If both the sensor public keys match each other, in Processing 1014, the external apparatus 43 decrypts the sensor hash value SH encrypted in the acquired signature information for the sensor by using the sensor public key SK in the certificate. In Processing 1015, the external apparatus 43 calculates an image hash value RH by using the hash function on the basis of the acquired image information 44.

In Processing 1016, the external apparatus 43 determines whether or not the sensor hash value SH and the image hash value RH match each other. If the sensor hash value SH and the image hash value RH match each other, the external apparatus 43 outputs an image, which is not forged, by using the acquired image information 44. If the sensor hash value SH and the image hash value RH do not match each other, the external apparatus 43 does not output the image.

In this embodiment, in addition to the effect of the first forgery-preventing method, the electronic signature information using the certificate issued from the manufacturer 100 or the certificate authority (CA) makes it possible to not only detect falsification of the image information but also check that the sensor public key is correct. Thus, the image sensor 30 can be more reliably identified.

Figure 11A:
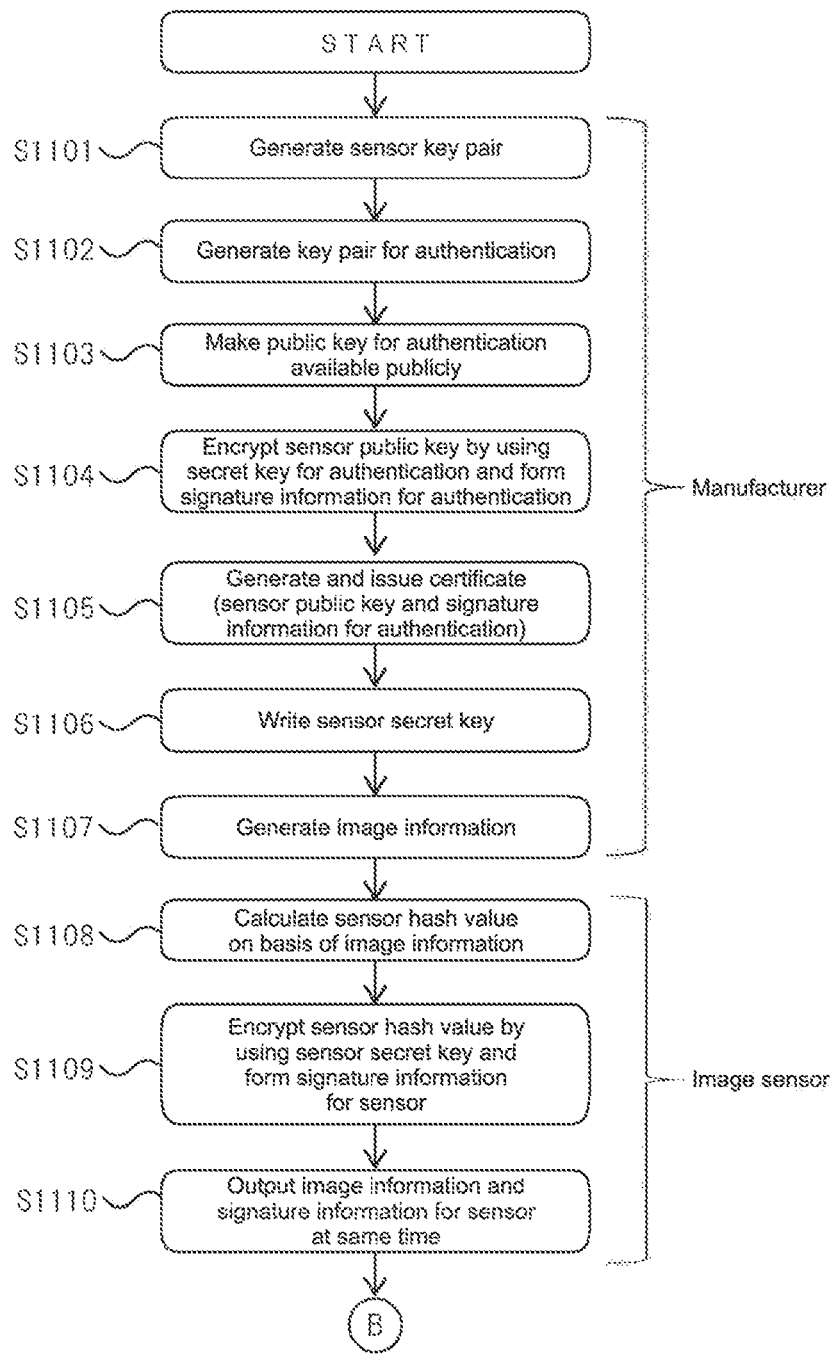
FIG. 11A A flowchart for describing the second image forgery-preventing method according to the present technology.
Figure 11B:
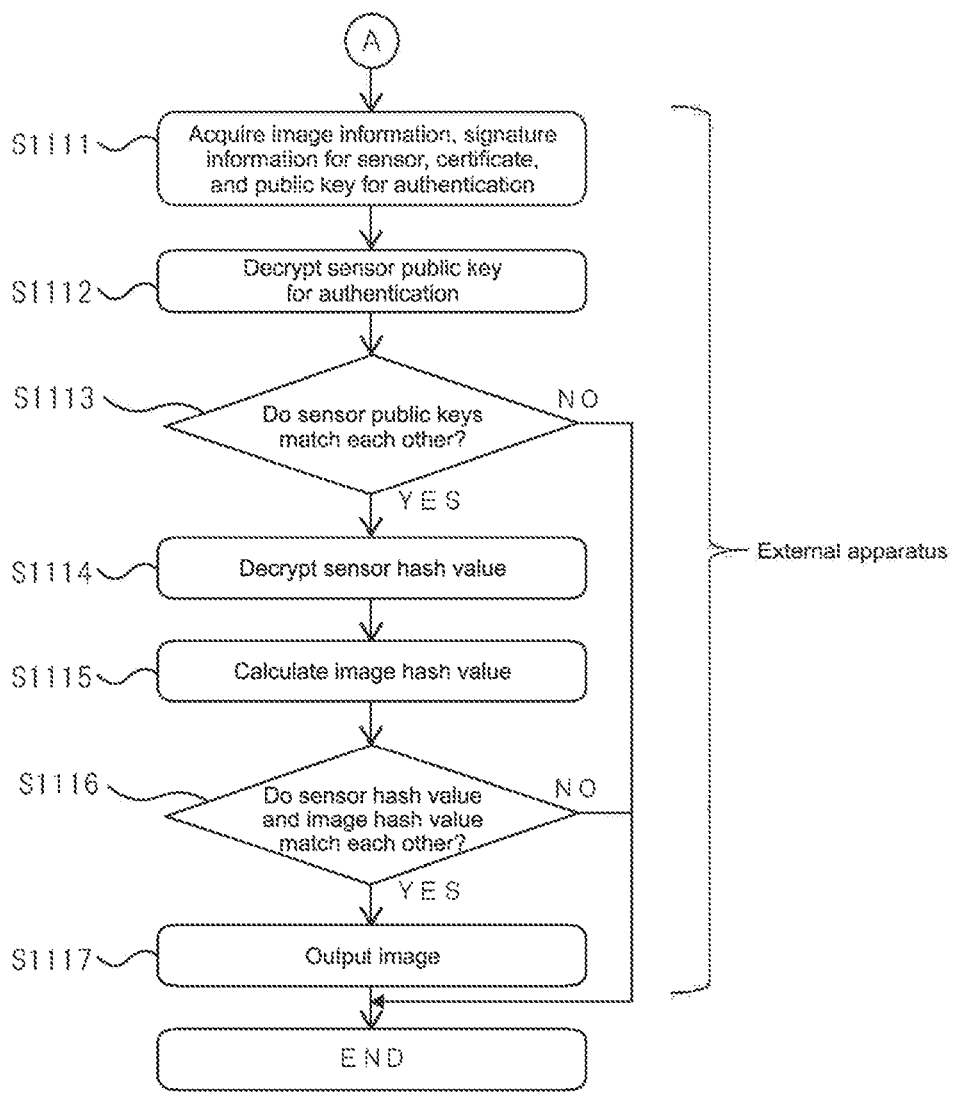
FIG. 11B A flowchart for describing the second image forgery-preventing method according to the present technology.

FIGS. 11A and 11B are flowcharts for describing the image forgery-preventing method of the second embodiment according to the present technology. Respective processes of the image forgery-preventing method of this embodiment will be described with reference to FIGS. 11A and 11B.

In Step S1101 of FIG. 11A, the manufacturer 100 for the image sensor 30 generates a sensor key pair of a sensor public key SK and a sensor secret key for performing encryption at the image sensor 30. After the sensor key pair is generated, the processing proceeds to Step S1102.

In Step S1102, the manufacturer 100 generates a key pair for authentication of a public key for authentication and a secret key for authentication for certificate generation. After the key pair for authentication is generated, the processing proceeds to Step S1103

In Step S1103, the manufacturer 100 makes the public key for authentication available publicly and sends it to the external apparatus 43 that is on the developer side. After the public key for authentication is made available publicly, the processing proceeds to Step S1104.

In Step S1104, the manufacturer 100 encrypts the sensor public key SK and its owner information by using the secret key for authentication, to thereby form signature information for authentication. After the signature information for authentication is formed, the processing proceeds to Step S1105.

In Step S1105, the manufacturer 100 generates a certificate in which the sensor public key SK and the signature information for authentication are written and issues it to the external apparatus 43 via the image sensor 30. After the certificate is issued, the processing proceeds to Step S1106.

In Step S1106, the manufacturer 100 writes the sensor secret key in the image sensor 30. After the sensor secret key is written in the image sensor 30, the processing proceeds to Step S1107.

Next, in Step S1107, the A/D conversion unit 25 of the image sensor 30 receives electrical signals from the sensor unit 21 and generates image information 44. After the image information 44 is generated by the A/D conversion unit 25, the processing proceeds to Step S1108.

In Step S1108, the integrated-information forming unit 26 of the image sensor 30 calculates a sensor hash value SH by using the hash function on the basis of the generated image information 44. After the sensor hash value SH is calculated by the integrated-information forming unit 26, the processing proceeds to Step S1109.

In Step S1109, the integrated-information forming unit 26 encrypts the sensor hash value SH and the image sensor identification information of the image sensor 30 by using the sensor secret key, to thereby form signature information for the sensor that is an example of the integrated information 45. After the signature information for the sensor is formed by the integrated-information forming unit 26, the processing proceeds to Step S1110.

In Step S1110, the image information output unit 24 outputs the generated image information 44 and the signature information for the sensor that is an example of the integrated information 45 to the external apparatus 43 to be used by a user or the like at the same time. After the image information 44 with the signature information for the sensor is output to the external apparatus 43, the processing proceeds to Step S1111 of FIG. 11B.

In Step S1111 of FIG. 11 B, the integrated-information analyzing unit 46 of the external apparatus 43 that is on the image developer side acquires the image information 44 with the signature information for the sensor, which has been output by the image information output unit 24, the certificate issued by the manufacturer 100, and the public key for authentication made available publicly by the manufacturer 100. After these pieces of information are acquired by the integrated-information analyzing unit 46, the processing proceeds to Step S1112.

In Step S1112, the integrated-information analyzing unit 46 decrypts the encrypted sensor public key CK in the signature information for authentication of the acquired certificate by using the acquired public key for authentication. After the sensor public key CK is decrypted by the integrated-information analyzing unit 46, the processing proceeds to Step S1113.

In Step S1113, the integrated-information analyzing unit 46 determines whether or not the decrypted sensor public key CK and the sensor public key SK in the certificate match each other.

In Step S1113, if YES, i.e., if the decrypted sensor public key CK and the sensor public key SK in the certificate match each other, the processing proceeds to Step S1114. In Step S1113, if NO, i.e., if the decrypted sensor public key CK and the sensor public key SK in the certificate do not match each other, the acquired sensor public key is not valid, and thus the external apparatus 43 terminates the image forgery-preventing processing without outputting the image.

In Step S1114, the integrated-information analyzing unit 46 decrypts the encrypted sensor hash value SH by using the sensor public key SK in the certificate. After the sensor hash value SH is decrypted by the integrated-information analyzing unit 46, the processing proceeds to Step S1115.

In Step S1115, as in the integrated-information forming unit 26, the integrated-information analyzing unit 46 calculates an image hash value RH by using the hash function on the basis of the acquired image information 44. After the image hash value RH is calculated by the integrated-information analyzing unit 46, the processing proceeds to Step S1116.

In Step S1116, the integrated-information analyzing unit 46 determines whether or not the sensor hash value SH and the image hash value RH match each other.

In Step S1116, if YES, i.e., if the sensor hash value SH and the image hash value RH match each other, the processing proceeds to Step S1117, and the external apparatus 43 outputs an image, which is not forged, by using the acquired image information 44, and then terminates the image forgery-preventing processing. In Step S1116, if NO, i.e., if the sensor hash value SH and the image hash value RH do not match each other, the acquired image information 44 is forged or altered, and thus the external apparatus 43 terminates the image forgery-preventing processing without outputting the image.

In accordance with the image forgery-preventing method of this embodiment, in addition to the effect of the first forgery-preventing method, the signature information for authentication using the certificate issued from the manufacturer 100 makes it possible to not only detect falsification of the image information 44 but also check that the sensor public key SK is correct. Thus, the image sensor 30 can be more reliably identified.

9. Image Alternation-Limiting Method

Figure 12:
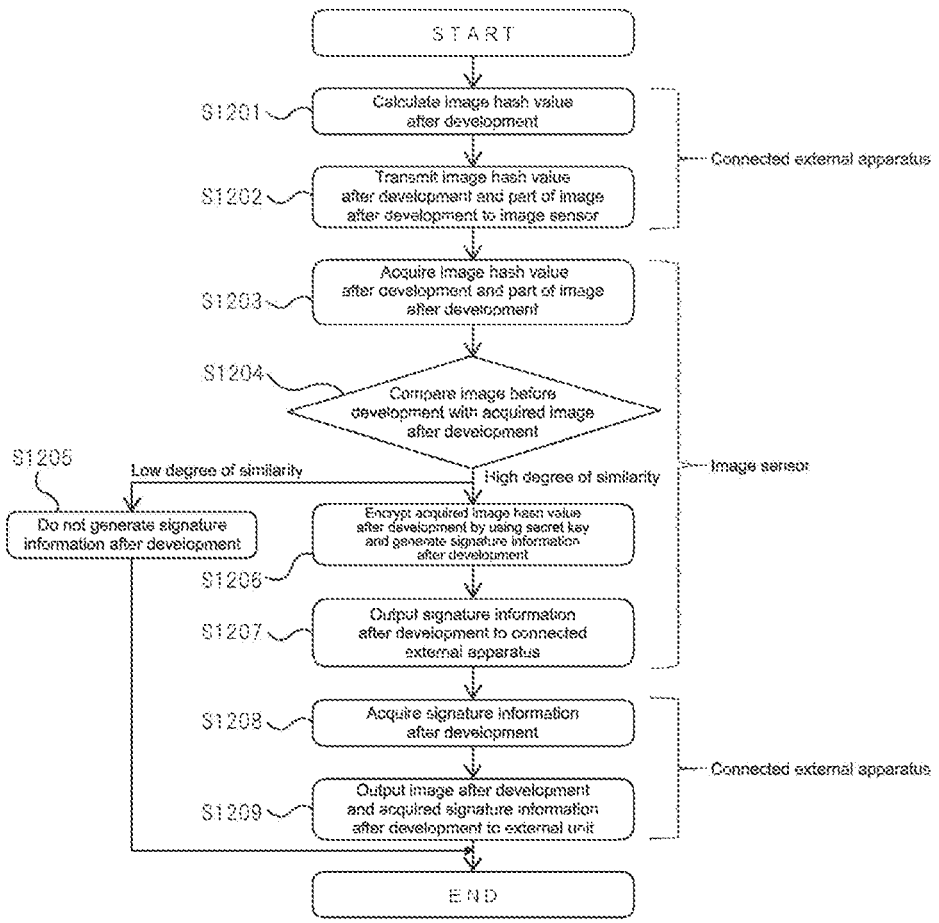
FIG. 12 A flowchart for describing an image alternation-limiting method according to the present technology.

FIG. 12 is a flowchart for describing an image alternation-limiting method according to the embodiment of the present technology. Respective processes of the image alternation-limiting method of this embodiment will be described with reference to FIG. 12. Here, the series of processing is started, for example, after the image information 44 is transmitted from the image sensor 30 of FIG. 4 to the external apparatus 43, which is a connection apparatus connected to the image sensor 30 and the image is developed by the external apparatus 43.

First of all, in Step S1201, the integrated-information analyzing unit 46 of the external apparatus 43 calculates an image hash value DH after development on the basis of image information after development. After the image hash value DH after development is calculated by the integrated-information analyzing unit 46, the processing proceeds to Step S1202.

In Step S1202, the integrated-information analyzing unit 46 transmits the image hash value DH after development, which is calculated in Step S1201, and a part of the image after development to the image sensor 30. After the image hash value DH after development and the part of the image after development are transmitted to the image sensor 30, the processing proceeds to Step S1203.

Next, in Step S1203, the integrated-information forming unit 26 of the image sensor 30 acquires the image hash value DH after development and the part of the image after development, which have been transmitted from the external apparatus 43. After the image hash value DH after development and the part of the image after development are acquired by the integrated-information forming unit 26, the processing proceeds to Step S1204.

In Step S1204, the integrated-information forming unit 26 determines a degree of similarity by comparing image information before development with the acquired image information after development.

The determination of the degree of similarity is performed in such a manner that a degree-of-similarity indicative value S of the image information before development and the acquired image information after development is compared with a threshold T and the electronic signature information is formed only in a case where it satisfies at least a predetermined condition. Note that although there are various methods such as SSD, SAD, NCC, and ZNCC for the degree-of-similarity indicative value S, zero-mean normalized cross-correlation (ZNCC) with less influence of brightness change after development will be described as an example in the present technology. If the degree-of-similarity indicative value S is smaller than the threshold T (S<T), the integrated-information forming unit 26 determines that the degree of similarity is high, and generates electronic signature information. The degree-of-similarity indicative value S indicates a lower degree of similarity as that value becomes larger. In a case where the degree-of-similarity indicative value S is equal to or larger than the threshold T (S≥T), the integrated-information forming unit 26 determines that the degree of similarity is low and does not generate the electronic signature information.

In Step S1204, if it is determined that the degree of similarity is low, the processing proceeds to Step S1205. Since it is determined that the acquired image information is forged or altered, the integrated-information forming unit 26 terminates the image alternation limiting processing without generating the signature. In Step S1204, if it is determined that the degree of similarity is high, the processing proceeds to Step S1206.

In Step S1206, the integrated-information forming unit 26 encrypts the acquired image hash value DH after development by using the sensor secret key, to thereby form signature information after development. After the signature information after development is formed by the integrated-information forming unit 26, the processing proceeds to Step S1207.

In Step S1207, the image information output unit 24 outputs the signature information after development formed in Step S1206 to the external apparatus 43. After the signature information after development is output to the external apparatus 43, the processing proceeds to Step S1208.

Next, in Step S1208, the integrated-information analyzing unit 46 of the external apparatus 43 acquires the signature information after development output by the image information output unit 24. After the signature information after development is acquired by the integrated-information analyzing unit 46, the processing proceeds to Step S1209.

In Step S1209, the integrated-information analyzing unit 46 outputs the image after development and the acquired signature information after development in association with each other to another external unit connected to the external apparatus 43, and then terminates the image alternation limiting processing. Note that the image after development with the signature information after development, which has been output to the other external unit, can be output from the other external unit in steps similar to Steps S908 to S912 of FIG. 9.

In accordance with the image alternation limiting processing method of this embodiment, the signature information after development is added to the image after development and is output to the external unit. Thus, the image alternation privilege can be added only to the image information after development, which is obtained by performing decryption processing on the image information 44 generated by the image sensor 30. With this configuration, it is possible to limit alternation with respect to an image obtained on the basis of image information generated by a unit other than the image sensor 30. As an example, only a user having a privilege to decrypt is enabled to use a development application service such as particular image correction processing.

10. Various Generation Methods for Electronic Signature Information

The generation method for the electronic signature information according to the present technology can take the following modes in addition to the above-mentioned embodiments.

The image sensor according to the present technology is capable of including information based on a picked-up image in the electronic signature information and encrypting and outputting it. With this configuration, the image information and the electronic signature information can be associated with each other As an example, hash value information generated on the basis of the image information or part of the image information can be included in the electronic signature information. With this configuration, large-amount image information can be associated with the electronic signature information with low computation load.

As another example, reduced-image information can also be included in the electronic signature information. With this configuration, features of the image information can be determined by using only the electronic signature information.

As another example, by performing development inside the image sensor and then outputting the image after development, information based on the image after development can also be included in in the electronic signature information. With this configuration, the electronic signature information associated with the image after development can be generated inside the image sensor.

As another example, by performing development or compression inside the image sensor and then outputting the compressed image, information based on the compressed image can also be included in the electronic signature information. With this configuration, the electronic signature information associated with the compressed image can be generated inside the image sensor.

Further, the image sensor according to the present technology is capable of including information specific to the image sensor in the electronic signature information and encrypting and outputting it. With this configuration, it becomes possible to identify the image sensor which has generated the electronic signature information.

As an example, identifiers specific to all image sensors can be included in the electronic signature information. With this configuration, it becomes possible to identify all the image sensors which have generated the electronic signature information.

As another example, a frame counter value that cannot be reset, which is retained also when the power supply is off, can also be included in the electronic signature information. With this configuration, a time (order) when the electronic signature information was generated can be roughly estimated.

Further, the image sensor according to the present technology is capable of including information regarding the image pickup condition of the image in the electronic signature information and encrypting and outputting it. With this configuration, a condition when the image is picked up can be determined on the basis of the electronic signature information.

As an example, GPS information can be included in the electronic signature information. With this configuration, a place where the electronic signature information was generated can be determined. As another example, time information can also be included in the electronic signature information. With this configuration, a time at which the electronic signature information was generated can be determined.

Further, the image sensor according to the present technology is capable of including information received from the external unit in the electronic signature information and encrypting and outputting it. With this configuration, the electronic signature information that certifies that it is a system connected to the image sensor can be generated.

Further, the image sensor according to the present technology is capable of including additionally encrypted information in the electronic signature information and encrypting and outputting it. With this configuration, only a person who can decipher the additionally encrypted information can get profit from that information.

11. Various Encryption Methods for Electronic Signature Information

The encryption method for the electronic signature information according to the present technology can take the following modes in addition to the above-mentioned embodiments.

The image sensor according to the present technology is capable of encrypting the electronic signature information by using a sensor key of encryption which is written during the manufacture of the image sensor. With this configuration, a person who generates an encryption key can be limited to a manufacturer, and thus alternation and forgery of the sensor key can be prevented.

As an example, it is possible to generate sensor key pairs specific to all image sensors and write a sensor secret key in each image sensor or to generate a large number of sensor key pairs and randomly write sensor secret keys in the image sensors. These configurations provide an advantage in that even if a sensor secret key is deciphered, only one image will suffer from damage.

As another example, it is also possible to set an arbitrary sensor key from the external unit and encrypt the electronic signature information by using it. With this configuration, not only an image sensor manufacturer but anyone can freely set a sensor key.

As another example, it is also possible to generate a sensor key pair inside the image sensor and output encrypted electronic signature information and a public key. With this configuration, if the sensor key is deciphered, damage is limited to a signature using the sensor key generated at that time. Thus, extremely high safety can be secured.

12. Various Reissue Methods for Electronic Signature Information after Development Moreover, the reissue method for electronic signature information after development according to the present technology can take the following modes.

The image sensor according to the present technology is capable of issuing the electronic signature information only in a case where the image output from the image sensor is developed. With this configuration, it is possible to generate electronic signature information based on not a raw image but information of the image information after development.

As an example, only in a case where the degree of similarity with the image information before development is high when the image information after development is acquired, the electronic signature information can be issued. With this configuration, the image sensor does not operate if an image is not a picked-up image, and thus spoofing can be prevented.

As another example, the image sensor can include a mechanism for checking direct connection to the external unit and the electronic signature information can be issued only when the connection is verified. With this configuration, the electronic signature information can be issued only to a system whose connection to the image sensor has been verified, and thus spoofing can be prevented.

As another example, the electronic signature information can be issued only under a condition authenticated in accordance with an external authentication program. With this configuration, the external program can ensure the reliability of the issued electronic signature information of the image after development.

13. Addition Method for Reliability Information

Next, a method of adding reliability information when the electronic signature information of the image after development is generated will be described. The reliability information is added by adding, to the electronic signature information, the degree-of-similarity indicative value S of the images before and after development by using the ZNCC method, for example.

Specifically, there is a method of comparison using a single color (only green components) or a method of comparison using luminance components (Y=R+G+B). With these methods, even a difference between raw image information before development and image information after development (RGB data) can be correctly obtained. Further, there is a method of determining a difference of a reduced image or a cropped image in order to reduce the processing of comparison.

The image sensor according to the present technology is capable of adding the reliability information when the electronic signature information of the image after development is generated as described above. With this configuration, it is possible to provide a degree of freedom in verification of the electronic signature information.

As another example, it is possible to compare the image before development with the image after development and include a quantitative numerical value of the degree of similarity in the electronic signature information and issue it. With this configuration, the system thereafter can be notified of it as the reliability information of the electronic signature information.

As another example, it is possible to issue electronic signature information, to which information indicating that it is the electronic signature information of the image after development is added, and write the number of times of issue. With this configuration, the system thereafter can be notified of it as the reliability information of the electronic signature information.

14. Application Service

Next, a mode of an application service according to the present technology will be described.

There is a copy and alternation-preventing service (e.g., SNS and copy-preventing function) utilizing individual identification of the image sensor. With this service, the image sensor can be identified, and thus spoofing becomes difficult.

Further, selective processing (e.g., optimal processing selection and sensor limitation processing) thereafter utilizing type identification of the image sensor can be performed. With this configuration, it becomes possible to promote sales of image sensors and optimize the image equality according to the image sensor.

In addition, a reissue service of the electronic signature information of the image after development can be provided by using the sensor secret key managed by the manufacturer. With this configuration, it is possible to check the electronic signature information and provide a service that reissues the electronic signature information by using the sensor secret key of that image sensor.

With the above-mentioned configurations and methods, a camera (image sensor) which has picked up an image can be identified in accordance with the present technology. Further, it becomes possible to prevent output raw image information from being easily forged (improperly used) by copying and altering it. In addition, the type of the image sensor can be determined on the developer side and thus a development method other than a general-purpose development method (also applicable to image) can be realized.

Further, although electronic information (digital data) is easily copied, optical (analog) information cannot be copied. Even if the electronic signature information is added to the image information and guaranteed by the external unit with respect to the image sensor, there is always a risk that original image information is a copy. However, by generating the electronic signature information inside the image sensor, it is possible to guarantee that the original image information is not a copy. Therefore, in this embodiment, the electronic signature information is generated inside the image sensor, and thus it is extremely advantageous for guaranteeing consistency between digital image information and a real image.

15. Configuration Example of Personal Computer

Figure 13:
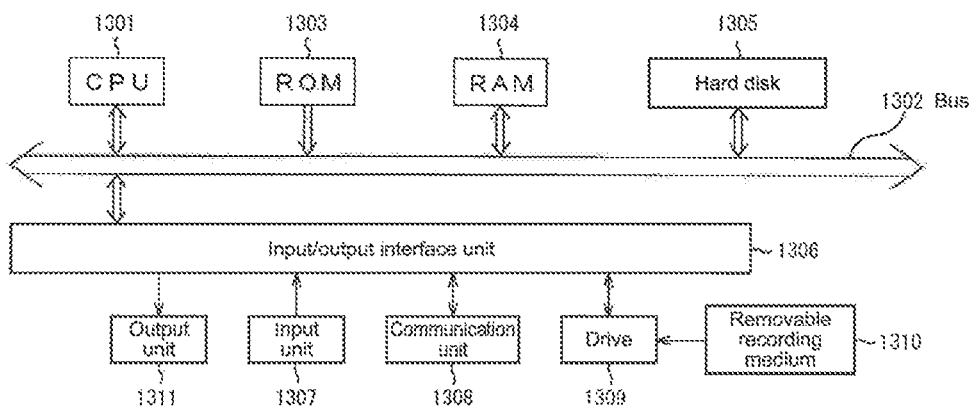
FIG. 13 A schematic view showing a configuration example of a personal computer according to the present technology.

FIG. 13 is a schematic view showing a configuration example of an image pickup apparatus according to the present technology and a personal computer that performs data communication. FIG. 13 shows a configuration example of an embodiment of a personal computer in which programs for executing the above-mentioned series of processing are installed.

The above-mentioned series of processing of the present technology may be executed by dedicated hardware or may be executed by software. In a case where the series of processing is executed by software, programs configuring the software are installed in a general-purpose computer or the like.

The computer of this embodiment includes a built-in central processing unit (CPU) 1301. A read only memory (ROM) 1303, a random access memory (RAM) 1304, a hard disk 1305, and an input/output interface unit 1306 are connected to the CPU 1301 via a bus 1302.

When a command is input into the CPU 1301 by, for example, a user operating an input unit 1307 including a keyboard, a mouse, a microphone, and the like via the input/output interface unit 1306, the CPU 1301 executes programs stored in the ROM 1303 in accordance with it. Further, the CPU 1301 loads programs stored in the hard disk 1305, programs transferred from a satellite or a network, received by a communication unit 1308, and installed in the hard disk 1305, or programs read from a removable recording medium 1310 mounted on a drive 1309 and installed in the hard disk 1305 into the RAM 1304 and executes the loaded programs.

In the above-mentioned manner, the CPU 1301 performs the processing according to the above-mentioned flowcharts or processing performed by the configuration of the above-mentioned block diagram. Then, the CPU 1301 outputs a processing result thereof from an output unit 1311 including a liquid crystal display (LCD), a speaker, and the like via the input/output interface unit 1306, for example, in a manner that depends on needs, or transmits the processing result from the communication unit 1308 and further causes the hard disk 1305 to record the transmitted processing result, for example The programs can be recorded in the hard disk 1305 and the ROM 1303 which are built-in recording media of the computer.

Further, the programs can be temporarily or permanently stored (recorded) in the removable recording medium 1310 such as a flexible disk, a compact disc read only memory (CD-ROM), a magneto-optical (MO) disk, a digital versatile disc (DVD), a magnetic disk, and a semiconductor memory. Such a removable recording medium 1310 can be provided as so-called package software.

Note that rather than being installed in the computer from the removable recording medium 1310 as described above, the programs can be wirelessly transferred to the computer from a downloading site via an artificial satellite for digital satellite broadcasting or can be wiredly transferred to the computer via a network such as a local area network (LAN) and the Internet, and in the computer, the programs transferred in this manner can be received by the communication unit 1308 and installed in the built-in hard disk 1305.

Here, herein, the processing steps that describe programs for causing the computer to execute various types of processing do not necessarily need to be processed sequentially in the order described as each flowchart, and also include processing executed concurrently or individually (e.g., concurrent processing or processing by object).

Further, the programs may be processed by one computer or may be distributed to and processed by a plurality of computers. In addition, the programs may be transferred to and executed by a remote computer.

Note that embodiments of the present technology are not limited to the above-mentioned embodiments, and various modifications can be made without departing from the gist of the present technology. For example, a mode combining all or some of the above-mentioned plurality of embodiments can be employed.

Further, the present technology can take the following configurations.

(1) An image sensor, at least including:

an image information processing unit that forms integrated information in which image sensor identification information capable of identifying the image sensor and image information obtained by an analog/digital conversion unit are associated with each other; and an image information output unit that outputs the integrated information to an external unit.

(2) The image sensor according to (1), in which the integrated information is electronic signature information obtained by encrypting the image sensor identification information and/or the image information.

(3) The image sensor according to (2), in which the electronic signature information is formed in accordance with an encryption instruction from the external unit.

(4) The image sensor according to (2), in which the electronic signature information is output to the external unit via a read register unit.

(5) The image sensor according to (2), in which the electronic signature information is output to the external unit via an interface unit.

(6) The image sensor according to (2), in which the electronic signature information includes an image pickup condition.

(7) The image sensor according to (2), in which the electronic signature information is information obtained by encrypting a hash value calculated on a basis of the image information.

(8) The image sensor according to (2), in which the electronic signature information is output such that the electronic signature information is displayed in part of the image information.

(9) The image sensor according to (2), in which the electronic signature information includes connected-apparatus information regarding an apparatus connected to the image sensor.

(10) The image sensor according to (2), in which the electronic signature information is information encrypted in accordance with a public-key method.

(11) The image sensor according to (10), in which the electronic signature information is information encrypted by using a secret key.

(12) The image sensor according to (10), in which the electronic signature information is information including a certificate that authenticates a public key.

(13) The image sensor according to (2), in which the electronic signature information further includes information formed by using image information after development of the image information output to the external unit.

(14) The image sensor according to (13), in which the electronic signature information is formed only in a case where a degree of similarity between the image information and the image information after development satisfies at least a predetermined condition.

(15) The image sensor according to (2), including a three-layer stacking structure having a configuration in which a signal processing substrate including the image information processing unit is provided between a pixel substrate and a memory substrate.

(16) An image pickup apparatus, at least including an image sensor including
an image information processing unit that forms integrated information in which image sensor identification information capable of identifying the image sensor and image information obtained by an analog/digital conversion unit are associated with each other, and
an image information output unit that outputs the integrated information to an external unit.

(17) An image sensor-identifying method, including identifying an image sensor by analyzing integrated information in which image sensor identification information capable of identifying the image sensor and image information obtained by an analog/digital conversion unit are associated with each other, the integrated information being output from the image sensor to an external unit.

(18) An image forgery-preventing method, including preventing forgery of image information by using electronic signature information in which image sensor identification information capable of identifying an image sensor and image information obtained by an analog/digital conversion unit are associated with each other and are encrypted, the electronic signature information being output from the image sensor to an external unit.

(19) An image alternation-limiting method, including giving an image alternation privilege only to decrypted image information obtained by performing decryption processing on image information including electronic signature information in which image sensor identification information capable of identifying an image sensor and the image information obtained by an analog/digital conversion unit are associated with each other and are encrypted, the image information being output from the image sensor to an external unit.

REFERENCE SIGNS LIST 1 image pickup apparatus
2 power supply circuit
3 image pickup lens
4 image information processing unit
5 display processing unit
6 display unit
7 camera control unit
8 image recording control unit
9 image recording unit
10, 20, 30, 50 image pickup element (image sensor)
11 power supply line
12 to 17 signal line
21 sensor unit
22 pixel substrate
23 signal processing substrate
24 image information output unit
25 analog/digital conversion unit (A/D conversion unit)
26 integrated-information forming unit
31 memory substrate
42, 52, 58, 59 transmission path
43, 53 external apparatus
44, 51 image information
45, 56 integrated information
46 integrated-information analyzing unit
54 write register unit
55 read register unit
57 integrated-information control unit
80, 100 manufacturer
1301 CPU
1302 bus
1303 ROM
1304 RAM
1305 hard disk
1306 input/output interface unit
1307 input unit
1308 communication unit
1309 drive
1310 removable recording medium
1311 output unit

The invention claimed is:
1. An apparatus, comprising:
an integrated-information analyzing device configured to:

receive data of an image sensor, wherein the data includes image information and integrated information; and identify the image sensor based on analysis of the data, wherein the image information is obtained by an analog/digital conversion device of the image sensor, the integrated information includes electronic signature information obtained by encryption of identification information of the image sensor, and the electronic signature information is encrypted based on a public-key method.

2. The apparatus according to claim 1, wherein the electronic signature information is encrypted further based on a secret key.

3. The apparatus according to claim 1, wherein the electronic signature information is displayed in a part of the image information.

4. The apparatus according to claim 1, wherein the electronic signature information includes an image pickup condition.

5. The apparatus according to claim 1, wherein the electronic signature information is obtained based on encryption of a hash value generated by the image sensor.

6. A method, comprising:

in an integrated-information analyzing device:

receiving data of an image sensor, wherein the data includes image information and integrated information; and identifying the image sensor based on analysis of the data, wherein the image information is obtained by an analog/digital conversion device of the image sensor, the integrated information includes electronic signature information obtained by encryption of identification information of the image sensor, and the electronic signature information is encrypted based on a public-key method.

7. The method according to claim 6, wherein the electronic signature information is encrypted further based on a secret key.

8. The method according to claim 6, wherein the electronic signature information is displayed in a part of the image information.

9. The method according to claim 6, wherein the electronic signature information includes an image pickup condition.

10. The method according to claim 6, wherein the electronic signature information is obtained based on encryption of a hash value generated by the image sensor.

11. A non-transitory computer-readable medium having stored thereon, computer executable instructions, which when executed by a computer, cause the computer to execute operations, the operations comprising:

receiving data of an image sensor, wherein the data includes image information and integrated information; and identifying the image sensor based on analysis of the data, wherein the image information is obtained by an analog/digital conversion device of the image sensor, the integrated information includes electronic signature information obtained by encryption of identification information of the image sensor, and the electronic signature information is encrypted based on a public-key method.

12. The non-transitory computer-readable medium according to claim 11, wherein the electronic signature information is encrypted further based on a secret key.

13. The non-transitory computer-readable medium according to claim 11, wherein the electronic signature information is displayed in a part of the image information.

14. The non-transitory computer-readable medium according to claim 11, wherein the electronic signature information includes an image pickup condition.

15. The non-transitory computer-readable medium according to claim 11, wherein the electronic signature information is obtained based on encryption of a hash value generated by the image sensor.

* * * * *